United States Patent [19]

Livezey et al.

[11] Patent Number: 5,029,967
[45] Date of Patent: Jul. 9, 1991

[54] OPTICAL SOURCE FOR OPTICAL SENSING SYSTEM

[75] Inventors: Darrell L. Livezey, Bellevue; David M. Griffith, Renton; Raymond W. Huggins, Mercer Island, all of Wash.

[73] Assignee: The Boeing Company, Seattle, Wash.

[21] Appl. No.: 506,424

[22] Filed: Apr. 9, 1990

[51] Int. Cl.$^5$ .............................................. G02B 6/34
[52] U.S. Cl. .................................................. 350/96.19
[58] Field of Search .................................... 350/96.19

[56] References Cited

U.S. PATENT DOCUMENTS

| | | | |
|---|---|---|---|
| 3,387,285 | 12/1963 | Horton | 340/173 |
| 3,532,429 | 6/1967 | Hughes et al. | 356/95 |
| 4,223,216 | 9/1980 | Quick et al. | 250/226 |
| 4,334,152 | 6/1982 | Dakin et al. | 250/226 |
| 4,517,456 | 5/1985 | Halsall et al. | 250/226 |
| 4,703,472 | 10/1987 | Blumentritt et al. | 350/96.19 X |
| 4,740,688 | 4/1988 | Edwards | 250/226 |
| 4,816,672 | 3/1989 | Hughes | 250/231 |
| 4,826,270 | 5/1989 | Opheij et al. | 350/3.72 |
| 4,849,624 | 7/1989 | Huggins | 250/226 |

OTHER PUBLICATIONS

Dianov et al., Spectral Channel Demultiplexer Utilizing a Planar Multimode Waveguide, Sov. J. Quantum Electron, 11(2), Feb. 1981, pp. 229-230.
Fritsch et al., Wavelength-Division Multiplexed Digital Optical Position Transducer, Optics Letters, 11(1), Jan. 1986, pp. 1-3.
Lewis, N., Fiber Optic Sensor Offer Advantages for Aircraft, SPIE Optical Engineering Reports, Jun. 1957.
Touzet et al., Design of New Holographic Gratings for a High S/N Ratio Flat Field Spectrograph, Proceedings Reprint: SPIE Optical System Design, Analysis and Production for Advanced Technology Systems, 1986, pp. 409-415.
Yen et al, Planar Rowland Spectrometer for Fiber-Optic Wavelength Demultiplexing, Optics Letters, 6(12), Dec. 1981, pp. 639-641.
Concave Diffraction Gratings Design Guide, American Holographic.
U.S. patent application Ser. No. 325,249, Filed Mar. 17, 1989, Optical Digital Encoder Using Rowland Spectrometer.

Primary Examiner—John D. Lee
Assistant Examiner—Stephen W. Barns
Attorney, Agent, or Firm—Christensen, O'Connor, Johnson & Kindness

[57] ABSTRACT

An optical source for use in an optical sensing system such as a wavelength division multiplexing system. The source produces an optical interrogation signal comprising a plurality of component signals, each component signal comprising light in a wavelength band different from the wavelength bands of the other component signals. The source comprises a concave diffraction grating, means for forming an aperture at which the interrogation signal will be formed, and a plurality of optical emitters. Each emitter is positioned such that the emitter output signal strikes the concave diffraction grating, and is focused onto the aperture, such that a portion of the emitter signal enters the aperture and forms one of the component signals. As a result, the component signal wavelengths are not sensitive to temperature-induced fluctuations in the emitter output signal.

10 Claims, 5 Drawing Sheets

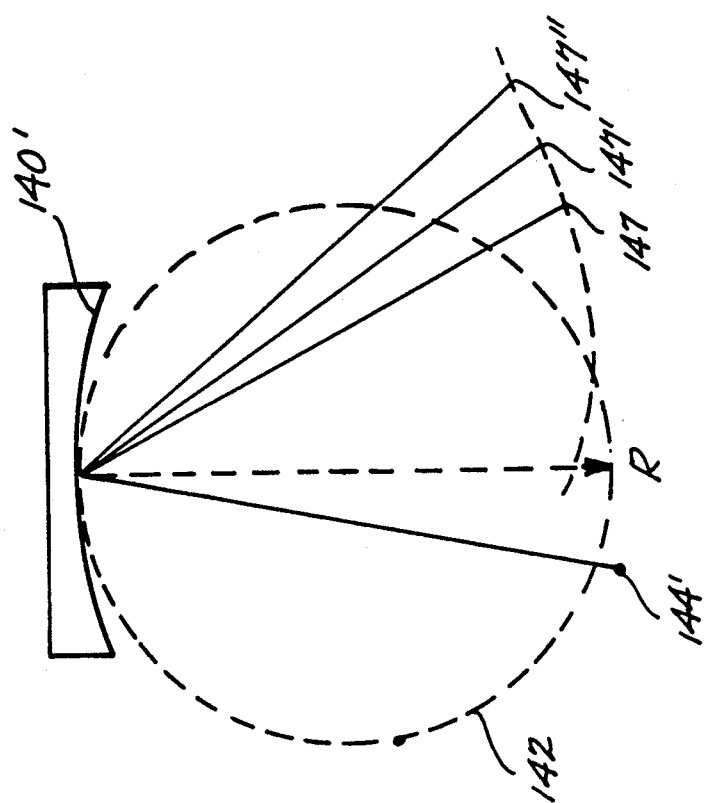
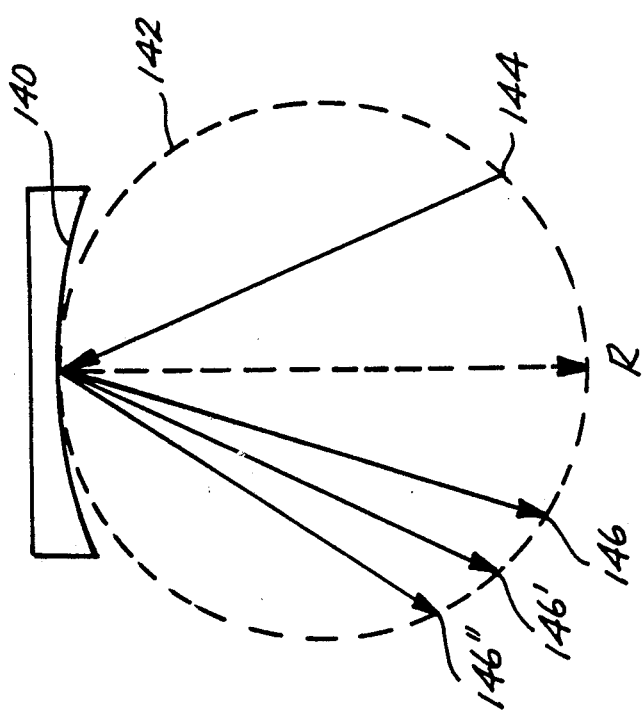

OPTICAL SOURCE FOR OPTICAL SENSING SYSTEM

FIELD OF THE INVENTION

The present invention relates to optical sensing systems and, in particular, to an optical source usable in a wavelength division multiplexed system for reading an encoder.

BACKGROUND OF THE INVENTION

A number of attempts have been made to design and fabricate high precision optical sensing systems in which a position sensor is coupled to an optical source and detector using optical fibers. In one known type of system, an encoder is attached to a movable member, and the position of the member is determined by optically interrogating the encoder. The member may be one that rotates, in which case the encoder may comprise a disk that rotates with the member, or the member may be linearly movable, in which case the encoder moves linearly along with the member. The position of the movable member may itself be the desired measurand, or the system may be designed such that the member moves as a measurand (e.g., temperature or pressure) varies.

In a digital encoding system, the encoder includes a number of parallel coded tracks, each of which represents a specific bit in a binary word. Each track comprises a series of elements, each of which has an optical property that can assume one of two states, such as transmitting or nontransmitting. For each position of the encoder, the tracks will present a different set of elements, and therefore a different binary word, to the optical interrogation system. The precision of the system is limited only by the highest achievable element density of the least significant track.

Wavelength division multiplexing (WDM) may be used to permit an optical interrogation signal to be coupled to the sensor along a single fiber-optic cable, and to permit the resulting encoded signal to be returned to a detector along a single fiber-optic cable. The optical interrogation signal is formed such that it comprises light in a plurality of different wavelength bands. At the sensor, the interrogation signal is demultiplexed, such that each wavelength band strikes a different track. In an analog encoder system, the encoder includes a track that has a continuously variable optical property, or an optical property that varies in a relatively large number of steps. An interrogation signal is transmitted to the encoder along an optical fiber, passes through the variable density track, and then is returned to a suitable detector. Since the attenuation of the optical signal passing to and from the sensor is generally unknown, the interrogation signal generally comprises two component signals having different wavelength bands. At the sensor, the interrogation signal is demultiplexed, with one encoder system passing through the track, and the other component system bypassing the track. At the detector, the component signals are again demultiplexed, to provide an attenuation measurement that is relatively insensitive to fiber link losses.

Efforts have been made to develop a WDM system using laser diodes or light-emitting diodes to generate the interrogation signal. Lasers have very narrow bandwidths, typically less than five nanometers. By coupling the light from several lasers selected to emit at wavelengths that match the desired bands, the tracks of the sensor can be sequentially interrogated. However, this system fails if temperature excursions cause one or more laser emission wavelengths to drift out of their defined band. Other disadvantages of a laser system are the high costs and control circuit complexity associated with multiple lasers.

An alternative to a matched-band laser source is to use a broadband source, emitting for example over a range of 150 nanometers or more. Incandescent lamps, or several LEDs emitting at separate wavelengths, can be used to provide such a source. Typical LED spectra are 40 nanometers wide, and four LEDs would therefore be necessary for a 150 nanometer spectrum. The broadband light is modulated by the sensor, and the modulated signal is then dispersed onto a photodiode array for conversion to electrical signals. The disadvantage of this system is the cost and complexity associated with the photodiode array.

SUMMARY OF THE INVENTION

The present invention provides a novel optical source for use in an optical sensing system. The source comprises a plurality of discrete emitters, and thereby can be used in a time division multiplexing mode without requiring a detector array. However, the optical source has improved wavelength stability, as compared to prior discrete emitter sources.

In a preferred embodiment, the source produces an optical interrogation signal comprising a plurality of component signals, each component signal comprising light in a wavelength band different from the wavelength bands of the other component signals. The source comprises a concave diffraction grating, means for forming an aperture at which the interrogation signal will be formed, and a plurality of optical emitters. Each emitter is positioned such that the emitter signal produced by the emitter strikes the concave diffraction grating, and is focused into a focal spot at the aperture, such that a portion of the emitter signal enters the aperture and forms one of the component signals.

In a preferred embodiment, the bandwidths of the emitter signals and the aperture diameter are selected such that each focal spot diameter exceeds the aperture diameter. As a result, the range of wavelengths of each emitter signal that enters the aperture is less than the bandwidth of the emitter signal. The wavelength band of each component signal is therefore insensitive to variations in temperature of the emitter that produce the corresponding emitter signal.

BRIEF DESCRIPTION OF THE DRAWINGS

FIG. 4a and 4b illustrate the operation of Rowland spectrometers;

DETAILED DESCRIPTION OF THE PREFERRED EMBODIMENT

Figure 1:
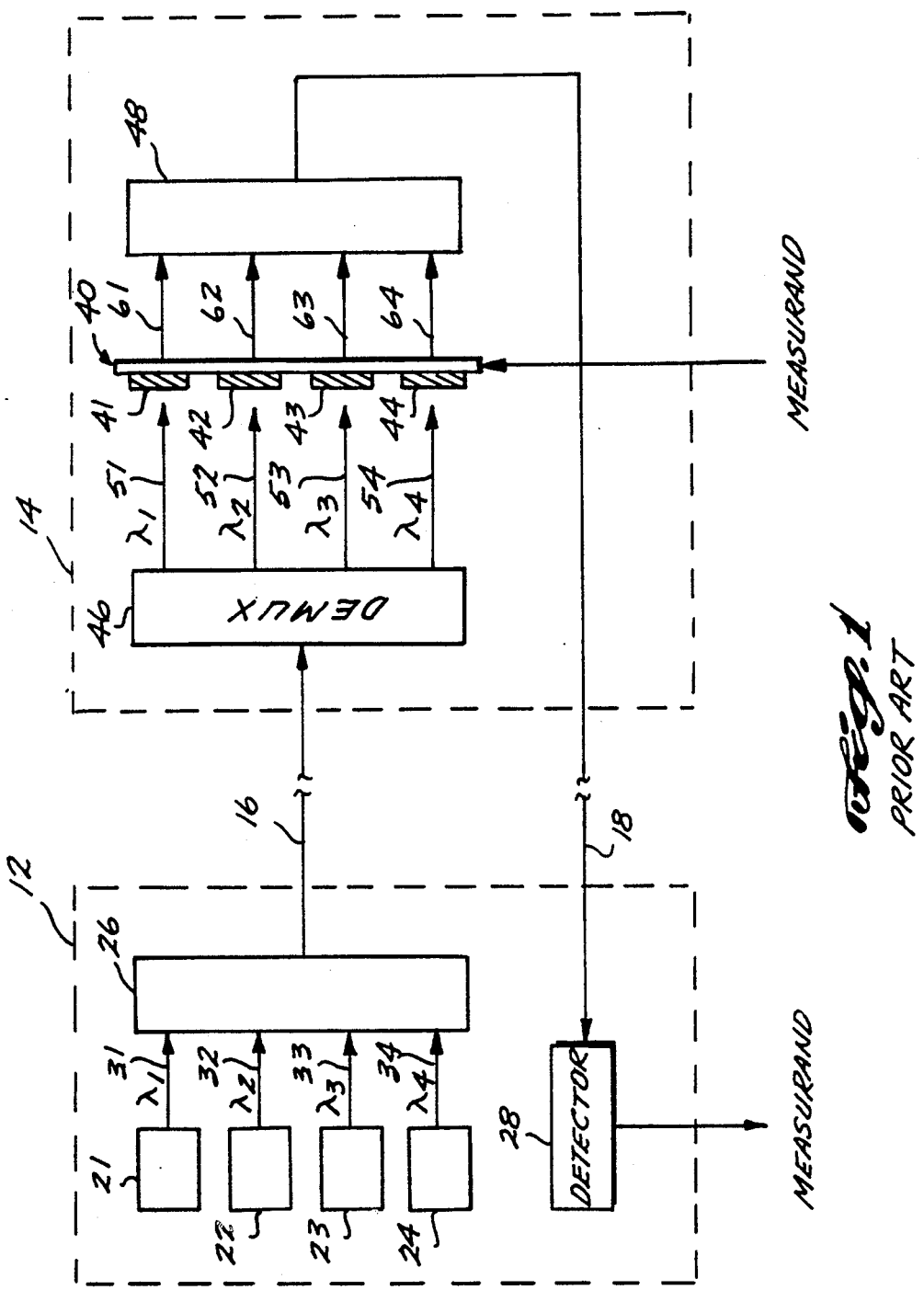
FIG. 1 is a schematic diagram of a WDM optical sensing system.

A known type of WDM optical sensing system is illustrated in schematic form in FIG. 1. The sensing system comprises interface unit 12 and sensor 14 coupled to one another by fiber-optic cables 16 and 18. The fiber-optic cables permit the sensor to be located at a position remote from the interface unit. The interface unit produces an optical interrogation signal on fiber-optic cable 16 that is received by the sensor. The sensor modulates the interrogation signal in a manner that depends upon the value of a measurand, and produces an optical return signal on fiber-optic cable 18. The return signal is received and decoded by the interface unit, to produce an electrical signal that indicates the current measurand value.

Interface unit 12 comprises optical emitters 21–24 that produce optical component signals 31–34, respectively. Each component signal comprises light in a wavelength band different from the wavelength bands of the other component signals. In FIG. 1, the four wavelength bands of component signals 31–34 are symbolized by $\lambda_1$, $\lambda_2$, $\lambda_3$, and $\lambda_4$, respectively. By way of example, emitters 21–24 could be four LEDs that produce light centered at 730, 770, 810, and 865 nanometers, respectively. The component signals are combined by optical combining means 26 to produce the interrogation signal on fiber-optic cable 16.

In general, in a WDM system, the illumination source can comprise a single broadband emitter such as an incandescent bulb, rather than the plurality of discrete emitters illustrated in FIG. 1. However, an advantage of using discrete emitters is that a time division multiplexing approach can be used in which the emitters are sequentially pulsed on and off, thereby permitting simplification of the detection system as described below.

Sensor 14 comprises encoder 40, demultiplexer 46, and multiplexer or combiner 48. Typically, the encoder is coupled to a movable member whose position is to be sensed. More generally, sensor 14 could be constructed such that encoder 40 moves in response to any arbitrary measurand. In the illustrated example, the encoder includes four tracks 41–44. The tracks are illustrated in cross section, i.e., encoder 40 moves in a direction normal to the plane of the drawing.

Each track comprises a series of modulation elements, each of which can have one of two (or more) states, e.g., transmitting or nontransmitting. Demultiplexer 46 receives the interrogation signal on fiber-optic cable 16, and demultiplexes the interrogation signal to produce component signals 51–54 that correspond generally to component signals 31–34. Component signals 51–54 fall on tracks 41–44, respectively, and light transmitted by the tracks appears as modulated signals 61–64, respectively. The modulated signals are combined by multiplexer or combiner 48, to produce an optical return signal on fiber-optic cable 18 that is transmitted back to detector 28 in interface unit 12.

In the illustrated embodiment in which four discrete emitters 21–24 are used as the source of the interrogation signal, emitters 21–24 can be time multiplexed, such that each of tracks 41–44 is sequentially interrogated. In this case, detector 28 may comprise a single photodetector whose output determines whether a given track is transmitting or nontransmitting. On the other hand, in a system in which a broadband interrogation signal is transmitted to the sensor along fiber-optic cable 16, all encoder tracks are interrogated simultaneously. In this case, detector 28 must include a demultiplexer for separating the return signal into the individual modulation signals 61–64, and a photodiode array for measuring the intensities of the modulation signals.

Figure 2:
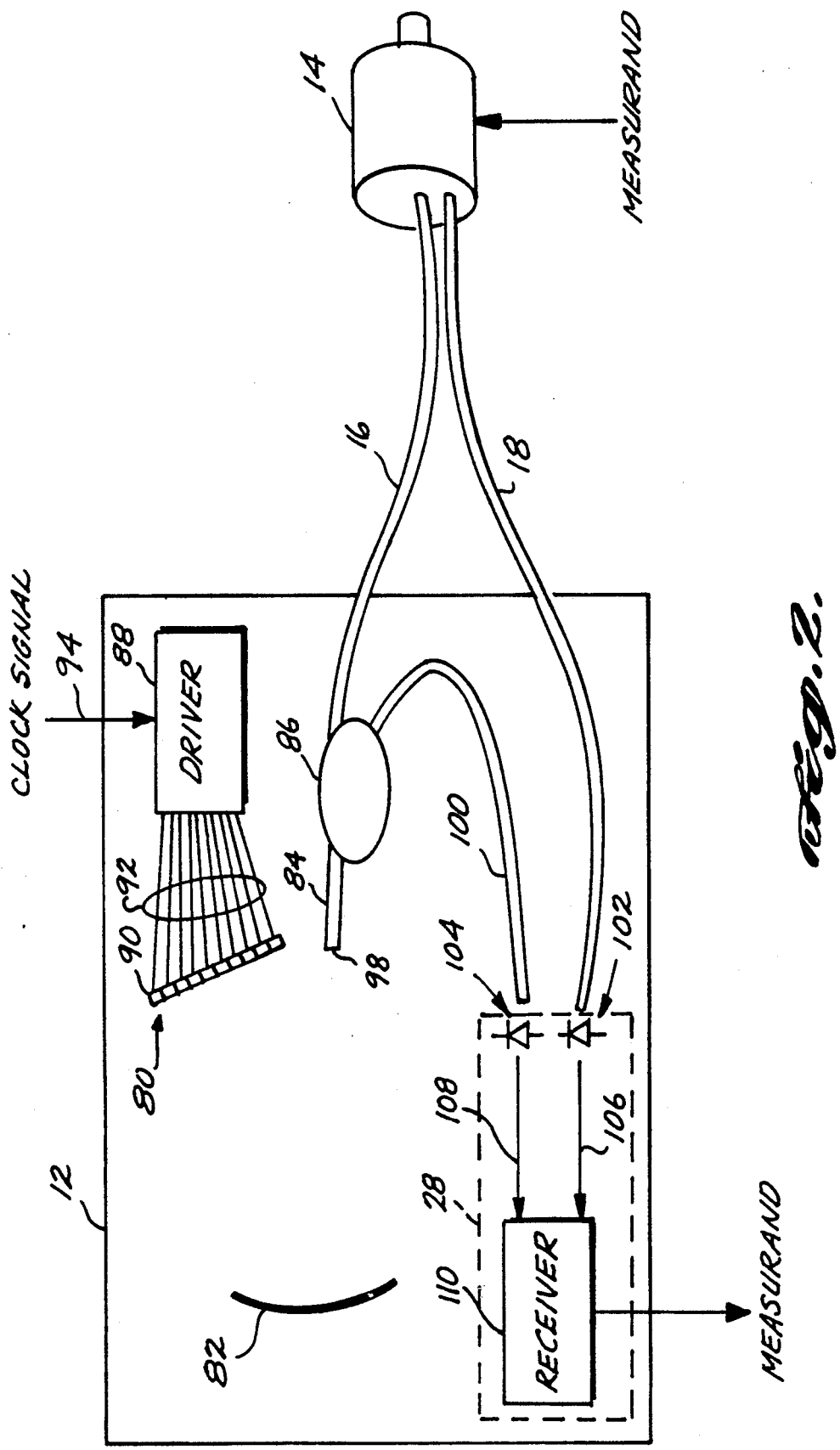
FIG. 2 is a schematic diagram of an optical sensing system using the optical source of the present invention.

The present invention provides a novel optical source that can be used in a WDM system of the general type shown in FIG. 1, as well as in other applications in which an interrogation signal having multiple wavelength components is required. A preferred embodiment of the present invention is illustrated in schematic form in FIG. 2, wherein the reference numerals of FIG. 1 have been adopted for corresponding parts. In particular, FIG. 2 illustrates a WDM system comprising interface unit 12 and sensor 14 interconnected by fiber-optic cables 16 and 18. Interface unit 12 comprises LED array 80, concave diffraction grating 82, fiber-optic cable 84, optical splitter 86, and LED driver 88. LED array 80 comprises a plurality of individual LEDs 90, each LED producing an emitter signal that comprises light in a wavelength range $\lambda_n$ different from the wavelength ranges of the other emitter signals.

The LEDs in array 80 are coupled to driver 88 by lines 92. Driver 88 sequentially pulses on LEDs 90, in response to clock signal 94. LEDs 90 are positioned such that each emitter signal is focused by concave diffraction grating 82 onto aperture 98 formed by one end of fiber-optic cable 84. As described more fully below, the portion of each emitter signal that enters aperture 98 forms one of the component signals. The component signals are transmitted through optical splitter 86 into fiber-optic cable 16, for transmission to sensor 14. A small portion of the optical power of each component signal is coupled by splitter 86 into fiber-optic cable 100, to provide a reference signal.

As described above in connection with FIG. 1, sensor 14 produces a plurality of modulated signals that are combined to produce a return signal on fiber-optic cable 18. Since the system is time multiplexed by LED driver 88, at any given time, photodetectors 102 and 104 respectively receive one of the modulated component signals on fiber-optic cable 18, and the corresponding reference signal on fiber-optic cable 100. The resulting pair of electrical signals 106 and 108 are input to receiver 110 that determines whether the track interrogated by the component signal is transmitting or nontransmitting, reflecting or nonreflecting, etc. By sequentially pulsing each of the LEDs in array 80, a complete binary word is formed, to thereby determine the value of the measurand measured by sensor 14.

Figure 3:
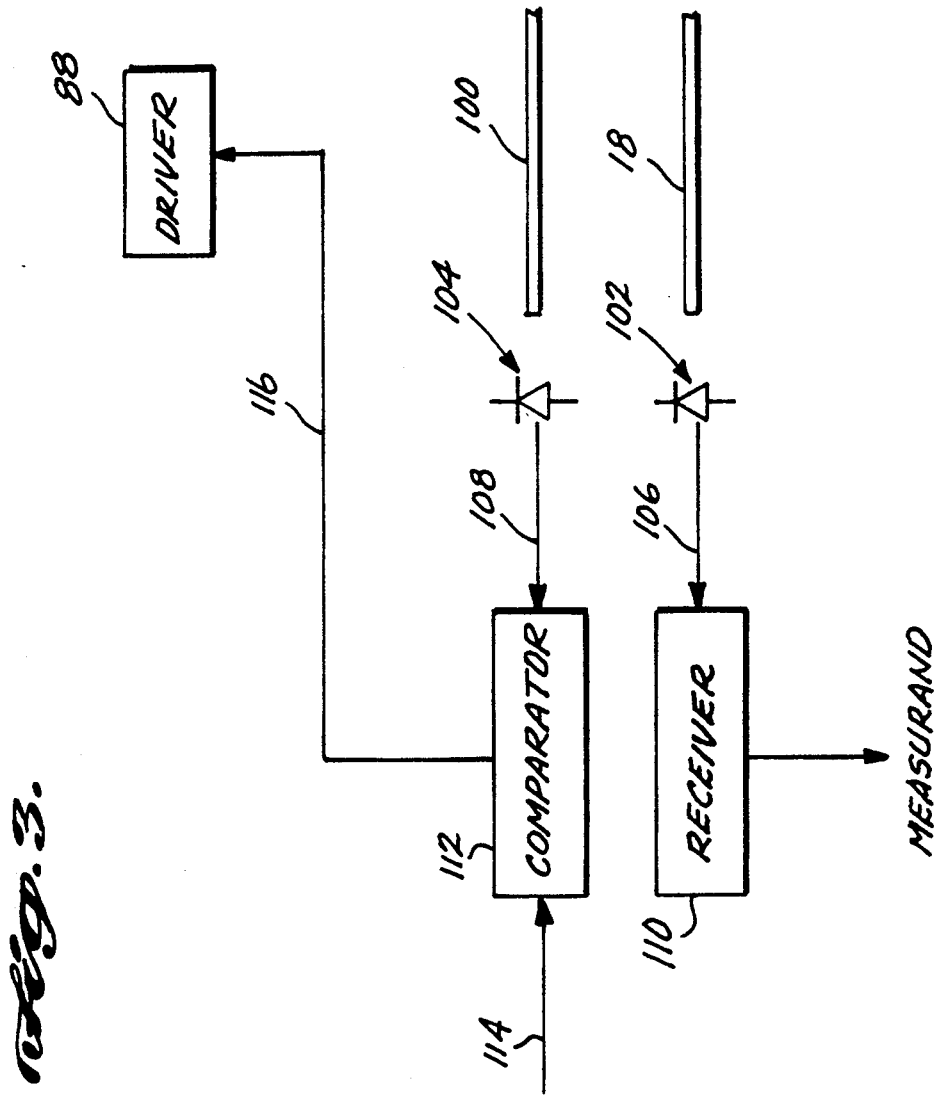
FIG. 3 is a partial schematic diagram illustrating an alternate normalization technique.

LED driver 88 in FIG. 2 sequentially pulses each LED 90 in LED array 80, to cover the entire spectrum, and then repeats based on the input clock signal. Receiver 110 normalizes the power emitted in each wavelength band by dividing the sensor signal by the reference signal. This normalization can be used to compensate for changes in the LED power as the temperature varies, or as the LED ages, or for interconnect degradation. Another normalization approach is shown in FIG. 3. In this arrangement, comparator 112 compares reference signal 108 to a signal 114 representing the desired power level, and the resulting error signal 116 is provided to drive 88. In response, the driver changes the drive current for the particular LED, to equalize the power in the wavelength bands. A third normalization technique that may be used dispenses with splitter 86, and simply positions another optical fiber adjacent to optical fiber 84, where it will receive sufficient power to produce the reference signal.

Pulsing of the LEDs provides benefits compared to a steady broadband source. With N LEDs, the duty cycle will be 1/N, producing a longer LED lifetime. Alternatively, the reduced duty cycle allows one to overdrive the LEDs to produce more light, but now the increased lifetime may be sacrificed. This tradeoff will depend on the power budget of the system.

The properties of concave diffraction gratings can be understood with reference to FIGS. 4a and 4b. FIG. 4a illustrates a classical Rowland spectrometer of the general type illustrated, for example, in U.S. Pat. No. 3,532,429. Such a spectrometer comprises a concave, reflective diffraction grating 140 as a dispersion element. The concave surface of grating 140 has a spherical shape, with a radius of curvature equal to R. The grating comprises linear grooves that are equally spaced along a chord of the concave grating surface. For such a concave grating, there is an associated Rowland circle 142 having a radius of R/2. The significance of the Rowland circle is that if a monochromatic point source 144 is positioned on the Rowland circle, then grating 140 will produce a focused image 146 of source 144 at another position on Rowland circle 142. The position of image 146 is a function of the wavelength of the light. Thus, if source 144 comprises three different wavelength components, then three focused images 146, 146′, and 146″ will be produced on the Rowland circle. If source 144 has a significant bandwidth, then a continuous spectrum will be imaged on the Rowland circle, with the spatial extent of the imaged spectrum corresponding to the bandwidth.

With the advent of high-powered, coherent optical sources, it has become possible to produce diffraction gratings with complex line spacings using what are loosely referred to as holographic techniques. The relationship between the holographic exposure conditions and source position to focal position for any wavelengths to produce a modified Rowland spectrometer is described in U.S. Pat. No. 3,973,850. An example of a spectrometer based on such a grating is shown in FIG. 4b. In this illustration, diffraction grating 140′ has been produced holographically, and the spacing of the lines on the grating surface is no longer linear across a chord, as in the conventional Rowland spectrometer. Holographic illumination conditions can be found which modify the grating focusing property to produce a desired result. For example, if the source 144′ is located away from Rowland circle 142, focused images 147, 147′, and 147″ will be produced at points removed from the Rowland circle. It is further possible to design the holographic illumination conditions so that a curve drawn through the three focal points approximates a straight line over a limited wavelength range. Gratings with similar complex line spacings can also be ruled by an interferometrically controlled ruling engine.

Figure 5:
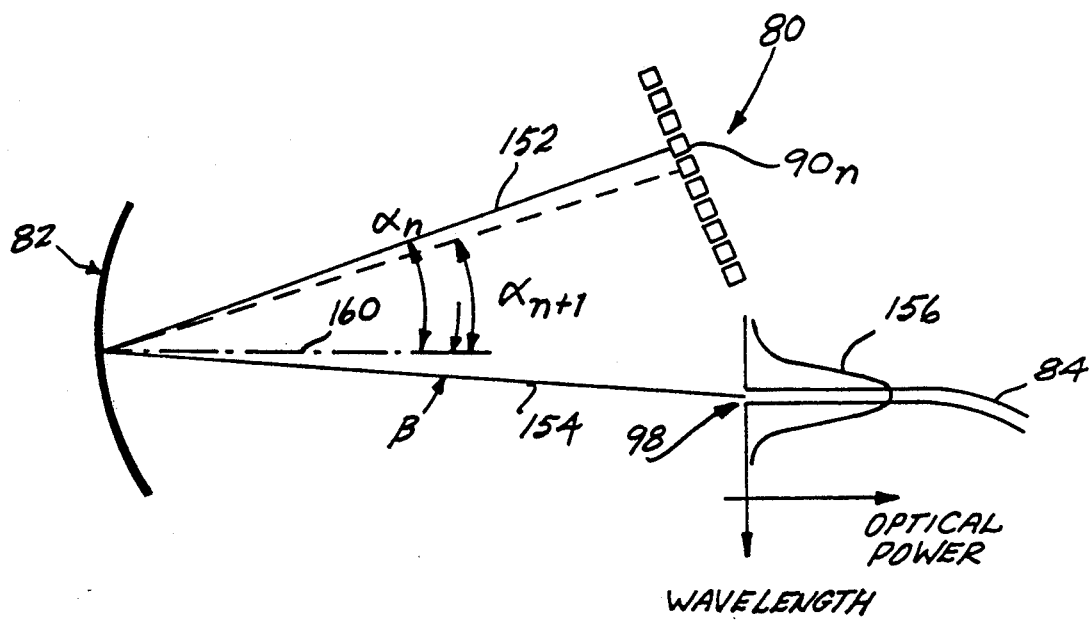
FIG. 5 is an optical diagram showing the focusing of light from individual LEDs to form the interrogation signal.

The geometric relationship between the LEDs of array 90, diffraction grating 82 and aperture 98 are illustrated in further detail in FIG. 5. Each LED produces light in a predetermined bandwidth, typically about 40 nanometers wide. Each LED is positioned such that the light that it emits that strikes concave grating 82 is focused by the grating onto aperture 98. In FIG. 5, light from LED 90n follows optical paths 152 and 154 from the LED to the aperture. However, because the LED has a finite bandwidth, the light that it produces is dispersed in the focal plane of the aperture, as indicated by spectrum 156. Thus, only a certain portion of the light from each LED enters aperture 98. In addition, it may be seen that temperature changes or other effects that cause the spectrum of an LED to shift in wavelength will not change the wavelength of the light from that LED that enters aperture 98 to form one of the component signals. The component signal wavelength is therefore not sensitive to LED operating temperature, or to other factors that produce wavelength variations.

The mathematical relationship defining the angles $\alpha_n$ and $\beta$ shown in FIG. 5 is as follows:

$$\sin \alpha_n - m\lambda/g = \sin \beta$$

where $\alpha_n$ is the angle between the nth LED and the grating normal 160, $\beta$ is the angle between the grating normal and aperture 98, m is an integer value indicating the grating order, $\lambda$ is the wavelength of the light, and g is the grating period. This equation may therefore be used to solve for each LED angle $\alpha_n$ as a function of the wavelength of that LED.

Since fiber-optic cable 84 will generally have a relatively small aperture 98, a small wavelength band will be coupled into the fiber. The size of the fiber will thus determine the width of the coupled spectrum, so it is possible to have a very narrow or broad coupled spectrum. In fact, with a wide enough fiber, the spectra from two LEDs could overlap, and a continuous spectrum could then be obtained. The WDM approach described above has less loss than a broadband source made by combining a light from several LEDs through a fiber-optic coupler. Typical loss for each WDM band is 4–5 dB, compared to 7 dB for a 4-LED coupler.

LED array 80 can be fabricated in at least three ways. In the first design, N individual devices are positioned at the grating focal plane as shown in FIG. 5. A monolithic array of emitters could also be used, the monolithic array comprising N LED junctions arranged side by side on the same semiconductor substrate. Third, an array of fibers could be positioned at the grating focal plane, with light from a set of LEDs coupled into the fibers.

Figure 6:
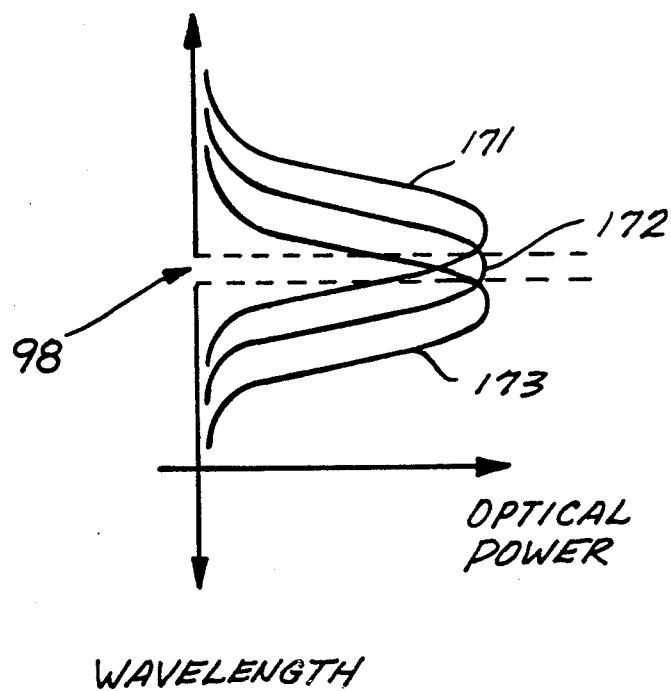
FIG. 6 is a sketch showing the combination of light from three identical LEDs to form the interrogation signal.

Another novel feature of the invention is that the selection criteria for the LEDs are relaxed. For digital sensors, the spectrum for each band would be narrower (10 nanometers total) than the LED spectrum. In order to maximize the power coupled into each wavelength band, it may be necessary to use LEDs that emit at different wavelengths. However, it will not be necessary to choose a different LED for each band, since the coupled spectrum is smaller than the LED spectrum. For example, three LEDs of the same wavelength may be used for three adjacent bands, as illustrated in FIG. 6. The different spatial position of the three LEDs will produce three different spatial distributions of the LED spectrum, indicated by reference numerals 171–173 in FIG. 6. All three LEDs are capable of coupling significant power into aperture 98, despite the lateral shifts of the spectra resulting from the different LED positions.

Another benefit of the invention is that several sensors may be illuminated by the same source, with only another photodiode circuit required for each additional sensor. The total number of sensors will be limited by the power budget. This compares very favorably against interface designs that use photodiode arrays for each channel, by decreasing the packaging size and complexity.

While the preferred embodiments of the invention have been illustrated and described, variations will be apparent to those skilled in the art. For example, although the invention has been illustrated in the context of a WDM digital encoder system, the invention could equally well be used in an analog encoding system in which the interrogation signal comprises a first component signal that will pass through the track, and a second reference signal. Accordingly, the scope of the invention is to be determined by reference to the following claims.

The embodiments of the invention in which an exclusive property or privilege is claimed are defined as follows:

1. An optical source for use in an optical sensing system, for producing an optical interrogation signal comprising a plurality of component signals, each component signal comprising light in a wavelength band different from the wavelength bands of the other component signals, the optical source comprising:
   a concave diffraction grating;
   means for forming an aperture at which the interrogation signal will be formed, the aperture having an aperture diameter; and
   a plurality of optical emitters, each emitter producing an emitter signal having a bandwidth, each emitter being positioned such that the emitter signal produced by the emitter strikes the concave diffraction grating, and is focused into a focal spot at the aperture, such that a portion of the emitter signal enters the aperture and forms one of the component signals, each focal spot having a focal spot diameter, the bandwidths of the emitter signals and the aperture diameter being selected such that each focal spot diameter exceeds the aperture diameter, such that the range of wavelengths of each emitter signal that enters the aperture is less than the bandwidth of the emitter signal.

2. The optical source of claim 1, wherein the bandwidths of at least two adjacent emitters are substantially identical.

3. The optical source of claim 1, wherein the emitter signals are sequentially produced.

4. The optical source of claim 3, further comprising means for producing a reference signal corresponding to the intensity of each component signal, and means for normalizing each emitter signal to a uniform power level by means of the reference signal.

5. The optical source of claim 1, wherein the means for forming an aperture comprise a fiber-optic cable having an end that forms said aperture.

6. The optical source of claim 1, wherein each emitter comprises an LED positioned in a focal plane of the grating.

7. The optical source of claim 6, wherein the LEDs are in the form of a monolithic array.

8. The optical source of claim 1, wherein each emitter comprises an LED and a fiber optic cable associated with the LED, each fiber optic cable having a first end positioned to receive light from the associated LED, and a second end positioned in a focal plane of the grating.

9. An optical source for use in an optical sensing system, for producing an optical interrogation signal comprising a plurality of component signals, each component signal comprising light in a wavelength band different from the wavelength bands of the other component signals, the optical source comprising:
   a concave diffraction grating;
   means for forming an aperture at which the interrogation signal will be formed; and
   a plurality of optical emitters, each emitter producing an emitter signal having a bandwidth, each emitter being positioned such that the emitter signal produced by the emitter strikes the concave diffraction grating, and is focused into a focal spot at the aperture, such that a portion of the emitter signal enters the aperture and forms one of the component signals, each focal spot having a focal spot diameter, the bandwidths of the emitter signals and the aperture diameter being selected such that each focal spot diameter exceeds the aperture diameter, such that the range of wavelengths of each emitter signal that enters the aperture is less than the bandwidth of the emitter signal each emitter comprising an LED and a fiber-optic cable associated with the LED, each fiber-optic cable having a first end positioned to receive light from the associated LED, and a second end positioned in a focal plane of the grating.

10. The optical source of claim 9, wherein the bandwidths of at least two adjacent emitters are substantially identical.

* * * * *